(12) United States Patent
Adams et al.

(10) Patent No.: US 7,649,880 B2
(45) Date of Patent: Jan. 19, 2010

(54) SYSTEMS AND METHODS FOR DERIVING STORAGE AREA COMMANDS

(76) Inventors: Mark Adams, 2132 Baxter St., Los Angeles, CA (US) 90039; Nicholas Witchey, 24832 Hon Ave., Laguna Hills, CA (US) 92653; Thomas Ludwig, 4800 Camino Costado, San Clemente, CA (US) 92673

( * ) Notice: Subject to any disclaimer, the term of this patent is extended or adjusted under 35 U.S.C. 154(b) by 608 days.

(21) Appl. No.: 11/305,679

(22) Filed: Dec. 16, 2005

(65) Prior Publication Data
US 2006/0101130 A1    May 11, 2006

Related U.S. Application Data

(63) Continuation-in-part of application No. 10/473,713, filed as application No. PCT/US02/40205 on Dec. 16, 2002, now Pat. No. 7,602,773.

(60) Provisional application No. 60/640,763, filed on Dec. 29, 2004, provisional application No. 60/425,867, filed on Nov. 12, 2002.

(51) Int. Cl.
   *H04L 12/28* (2006.01)
(52) U.S. Cl. .................. 370/389; 370/401
(58) Field of Classification Search ........... 370/389, 370/394, 400, 401, 465, 466, 469
   See application file for complete search history.

(56) References Cited

U.S. PATENT DOCUMENTS

| | | | |
|---|---|---|---|
| 4,890,227 A | 12/1989 | Watanabe et al. | |
| 5,129,088 A | 7/1992 | Auslander et al. | |
| 5,193,171 A | 3/1993 | Shinmura et al. | |
| 5,506,969 A | 4/1996 | Wall et al. | |
| 5,546,541 A | 8/1996 | Drew et al. | |
| 5,590,124 A | 12/1996 | Robins | |

(Continued)

FOREIGN PATENT DOCUMENTS

CN        1359214        7/2002

(Continued)

OTHER PUBLICATIONS

Lin JC and Paul S, "Rmtp: a reliable multicast transport protocol," Proceedings of IEEE INFOCOM '96, vol. 3, pp. 1414-1424, 1996.

(Continued)

*Primary Examiner*—Hong Cho
(74) *Attorney, Agent, or Firm*—Schwabe, Williamson & Wyatt, P.C.

(57) ABSTRACT

Systems and methods for quickly resolving storage area commands from packet addresses are presented. Clients exchange packets comprising addresses and payloads with physical storage areas that have controllers using a stateless protocol. Modules use the addresses in addition to payloads to derive commands that are understandable by the controller. Furthermore, the neither the module nor the controller require use of a file system to interact with the physical storage area. Modules can derive the storage area commands through resolving a context associated with physical storage area. In some embodiments, modules split addresses into portions that can be used as indices into context lookup tables. In other embodiments, modules can employ variants to router address lookup algorithms to quickly resolve storage area commands.

23 Claims, 9 Drawing Sheets

U.S. PATENT DOCUMENTS

| | | | |
|---|---|---|---|
| 5,590,276 A | 12/1996 | Andrews | |
| 5,634,111 A * | 5/1997 | Oeda et al. | 711/153 |
| 5,742,604 A | 4/1998 | Edsall et al. | |
| 5,758,050 A | 5/1998 | Brady et al. | |
| 5,758,188 A | 5/1998 | Appelbaum et al. | |
| 5,867,686 A * | 2/1999 | Conner et al. | 711/168 |
| 5,884,038 A | 3/1999 | Kapoor | |
| 5,889,935 A | 3/1999 | Ofek et al. | |
| 5,930,786 A | 7/1999 | Carino, Jr. et al. | |
| 5,937,169 A | 8/1999 | Connery et al. | |
| 5,949,977 A | 9/1999 | Hernandez | |
| 5,991,891 A | 11/1999 | Hahn et al. | |
| 6,018,779 A | 1/2000 | Blumenau | |
| 6,081,879 A | 6/2000 | Arnott | |
| 6,101,559 A | 8/2000 | Schultz et al. | |
| 6,105,122 A | 8/2000 | Muller et al. | |
| 6,128,664 A | 10/2000 | Yanagidate et al. | |
| 6,157,935 A | 12/2000 | Tran et al. | |
| 6,157,955 A | 12/2000 | Narad et al. | |
| 6,181,927 B1 | 1/2001 | Welling et al. | |
| 6,202,060 B1 | 3/2001 | Tran | |
| 6,246,683 B1 | 6/2001 | Connery et al. | |
| 6,253,273 B1 | 6/2001 | Blumenau | |
| 6,275,898 B1 | 8/2001 | DeKoning | |
| 6,288,716 B1 | 9/2001 | Humpleman et al. | |
| 6,295,584 B1 | 9/2001 | DeSota et al. | |
| 6,330,236 B1 | 12/2001 | Ofek et al. | |
| 6,330,615 B1 | 12/2001 | Gioquindo et al. | |
| 6,385,638 B1 | 5/2002 | Baker-Harvey | |
| 6,396,480 B1 | 5/2002 | Schindler et al. | |
| 6,401,183 B1 | 6/2002 | Rafizadeh | |
| 6,434,683 B1 | 8/2002 | West et al. | |
| 6,449,607 B1 | 9/2002 | Tomita et al. | |
| 6,466,571 B1 | 10/2002 | Dynarski et al. | |
| 6,470,342 B1 | 10/2002 | Gondi et al. | |
| 6,473,774 B1 | 10/2002 | Cellis et al. | |
| 6,480,934 B1 | 11/2002 | Hino et al. | |
| 6,487,555 B1 | 11/2002 | Bharat et al. | |
| 6,549,983 B1 | 4/2003 | Han et al. | |
| 6,567,863 B1 | 5/2003 | Lafuite et al. | |
| 6,601,101 B1 | 7/2003 | Lee et al. | |
| 6,601,135 B1 | 7/2003 | McBrearty et al. | |
| 6,618,743 B1 * | 9/2003 | Bennett | 718/104 |
| 6,629,264 B1 | 9/2003 | Sicola et al. | |
| 6,681,244 B1 | 1/2004 | Cross et al. | |
| 6,693,912 B1 | 2/2004 | Wang | |
| 6,701,431 B2 | 3/2004 | Subramanian et al. | |
| 6,701,432 B1 | 3/2004 | Deng et al. | |
| 6,710,786 B1 | 3/2004 | Jacobs et al. | |
| 6,711,164 B1 | 3/2004 | Le et al. | |
| 6,732,171 B2 | 5/2004 | Hayden | |
| 6,732,230 B1 | 5/2004 | Johnson et al. | |
| 6,741,554 B2 | 5/2004 | D'Amico et al. | |
| 6,754,662 B1 * | 6/2004 | Li | 707/101 |
| 6,757,845 B2 | 6/2004 | Bruce | |
| 6,772,161 B2 | 8/2004 | Mahalingam | |
| 6,775,672 B2 | 8/2004 | Mahalingam et al. | |
| 6,775,673 B2 | 8/2004 | Mahalingam et al. | |
| 6,795,534 B2 | 9/2004 | Noguchi | |
| 6,799,244 B2 | 9/2004 | Tanaka et al. | |
| 6,799,255 B1 * | 9/2004 | Blumenau et al. | 711/152 |
| 6,834,326 B1 | 12/2004 | Wang et al. | |
| 6,853,382 B1 | 2/2005 | Van Dyke et al. | |
| 6,854,021 B1 | 2/2005 | Schmidt et al. | |
| 6,862,606 B1 * | 3/2005 | Major et al. | 709/203 |
| 6,876,657 B1 | 4/2005 | Brewer et al. | |
| 6,886,035 B2 | 4/2005 | Wolff | |
| 6,894,976 B1 | 5/2005 | Banga et al. | |
| 6,895,461 B1 | 5/2005 | Thompson | |
| 6,895,511 B1 | 5/2005 | Borsato et al. | |
| 6,901,497 B2 | 5/2005 | Tashiro et al. | |
| 6,904,470 B1 | 6/2005 | Ofer et al. | |
| 6,907,473 B2 | 6/2005 | Schmidt et al. | |
| 6,912,622 B2 | 6/2005 | Miller | |
| 6,917,616 B1 | 7/2005 | Normand et al. | |
| 6,922,688 B1 | 7/2005 | Frey, Jr. | |
| 6,928,473 B1 | 8/2005 | Sundaram et al. | |
| 6,941,555 B2 | 9/2005 | Jacobs et al. | |
| 6,947,430 B2 | 9/2005 | Bilic et al. | |
| 6,985,956 B2 | 1/2006 | Luke et al. | |
| 7,039,934 B2 | 5/2006 | Terakado et al. | |
| 7,051,087 B1 | 5/2006 | Bahl et al. | |
| 7,065,579 B2 | 6/2006 | Traversat et al. | |
| 7,069,295 B2 | 6/2006 | Sutherland et al. | |
| 7,073,090 B2 | 7/2006 | Yanai et al. | |
| 7,111,303 B2 | 9/2006 | Macchiano et al. | |
| 7,120,666 B2 | 10/2006 | McCanne et al. | |
| 7,145,866 B1 | 12/2006 | Ting et al. | |
| 7,146,427 B2 | 12/2006 | Delaney et al. | |
| 7,149,769 B2 | 12/2006 | Lubbers et al. | |
| 7,152,069 B1 * | 12/2006 | Santry et al. | 707/100 |
| 7,184,424 B2 | 2/2007 | Frank et al. | |
| 7,188,194 B1 | 3/2007 | Kuik et al. | |
| 7,200,641 B1 | 4/2007 | Throop | |
| 7,203,730 B1 | 4/2007 | Meyer et al. | |
| 7,206,805 B1 | 4/2007 | McLaughlin, Jr. | |
| 7,237,036 B2 * | 6/2007 | Boucher et al. | 709/245 |
| 7,260,638 B2 | 8/2007 | Crosbie | |
| 7,263,108 B2 | 8/2007 | Kizhepat | |
| 7,278,142 B2 | 10/2007 | Bandhole et al. | |
| 7,296,050 B2 | 11/2007 | Vicard | |
| 7,333,451 B1 | 2/2008 | Khalil et al. | |
| 7,353,266 B2 | 4/2008 | Bracewell et al. | |
| 7,406,523 B1 | 7/2008 | Kruy et al. | |
| 7,415,018 B2 | 8/2008 | Jones et al. | |
| 7,428,584 B2 | 9/2008 | Yamamoto et al. | |
| 7,436,789 B2 | 10/2008 | Caliskan et al. | |
| 7,447,209 B2 | 11/2008 | Jeffay et al. | |
| 7,463,582 B2 | 12/2008 | Kelly et al. | |
| 7,526,577 B2 | 4/2009 | Pinkerton et al. | |
| 2001/0020273 A1 | 9/2001 | Murakawa | |
| 2001/0026550 A1 | 10/2001 | Kobayashi | |
| 2001/0049739 A1 | 12/2001 | Wakayama et al. | |
| 2002/0026558 A1 | 2/2002 | Reuter | |
| 2002/0029286 A1 | 3/2002 | Gioquindo et al. | |
| 2002/0039196 A1 | 4/2002 | Chiarabini | |
| 2002/0052962 A1 | 5/2002 | Cherkasova et al. | |
| 2002/0062387 A1 | 5/2002 | Yatziv | |
| 2002/0065875 A1 | 5/2002 | Bracewell et al. | |
| 2002/0087811 A1 | 7/2002 | Khare et al. | |
| 2002/0091830 A1 | 7/2002 | Muramatsu | |
| 2002/0126658 A1 | 9/2002 | Yamashita | |
| 2002/0165978 A1 | 11/2002 | Chui | |
| 2003/0018784 A1 | 1/2003 | Lette et al. | |
| 2003/0023811 A1 | 1/2003 | Kim et al. | |
| 2003/0026246 A1 | 2/2003 | Huang et al. | |
| 2003/0065733 A1 | 4/2003 | Pecone | |
| 2003/0069995 A1 * | 4/2003 | Fayette | 709/249 |
| 2003/0081592 A1 | 5/2003 | Krishnarajah et al. | |
| 2003/0118053 A1 | 6/2003 | Edsall et al. | |
| 2003/0130986 A1 | 7/2003 | Tamer et al. | |
| 2003/0161312 A1 | 8/2003 | Brown et al. | |
| 2003/0172157 A1 | 9/2003 | Wright et al. | |
| 2003/0182349 A1 | 9/2003 | Leong et al. | |
| 2003/0202510 A1 | 10/2003 | Witkowski et al. | |
| 2003/0204611 A1 | 10/2003 | McCosh et al. | |
| 2004/0025477 A1 | 2/2004 | Sichera et al. | |
| 2004/0047367 A1 | 3/2004 | Mammen | |
| 2004/0078465 A1 | 4/2004 | Coates et al. | |
| 2004/0100952 A1 * | 5/2004 | Boucher et al. | 370/389 |
| 2004/0181476 A1 | 9/2004 | Smith et al. | |
| 2004/0184455 A1 | 9/2004 | Lin | |
| 2005/0033740 A1 * | 2/2005 | Cao et al. | 707/3 |
| 2005/0058131 A1 | 3/2005 | Samuels et al. | |

| | | | |
|---|---|---|---|
| 2005/0102522 | A1 | 5/2005 | Kanda |
| 2005/0144199 | A2 | 6/2005 | Hayden |
| 2005/0166022 | A1 | 7/2005 | Watanabe |
| 2005/0175005 | A1* | 8/2005 | Brown .................... 370/389 |
| 2005/0198371 | A1 | 9/2005 | Smith et al. |
| 2005/0246401 | A1 | 11/2005 | Edwards et al. |
| 2005/0267929 | A1 | 12/2005 | Kitamura |
| 2005/0270856 | A1 | 12/2005 | Earhart et al. |
| 2005/0286517 | A1 | 12/2005 | Babbar et al. |
| 2006/0036602 | A1 | 2/2006 | Unangst et al. |
| 2006/0077902 | A1 | 4/2006 | Kannan et al. |
| 2006/0133365 | A1 | 6/2006 | Manjunatha et al. |
| 2006/0168345 | A1 | 7/2006 | Siles et al. |
| 2006/0176903 | A1 | 8/2006 | Coulier |
| 2007/0101023 | A1 | 5/2007 | Chhabra et al. |
| 2007/0110047 | A1 | 5/2007 | Kim |
| 2008/0181158 | A1 | 7/2008 | Bouazizi et al. |
| 2008/0279106 | A1 | 11/2008 | Goodfellow et al. |

FOREIGN PATENT DOCUMENTS

| | | |
|---|---|---|
| EP | 0485110 | 5/1992 |
| EP | 0654736 | 5/1995 |
| EP | 0700231 | 3/1996 |
| EP | 0706113 | 4/1996 |
| JP | 2001094987 | 4/2001 |
| JP | 2001359200 | 12/2001 |
| JP | 2002252880 | 9/2002 |
| JP | 2002318725 | 10/2002 |
| JP | 2005265914 | 9/2005 |
| WO | WO/01/001270 | 4/2001 |
| WO | WO02/015018 | 2/2002 |

OTHER PUBLICATIONS

B. Quinn et al. IP Multicast Applications: Challenges and Solutions. Sep. 2001. Network Working Group, RFC 3170.

Thomas E. Anderson, Michael D. Dahlin, Jeanna M. Neefe, David A. Patterson, Drew S. Roselli, and Randolph Y. Wang, Serverless network file systems. Dec. 1995. In Proceedings of the 15th Symposium on Operating Systems Principles.

International Search Report for Application No. PCT/US02/40205 dated May 27, 2004.

Ki-II Kim et al., "Internet Multicast Provisioning Issues for Hierarchical Architecture", 2001, IEEE.

Lee et al. "A Comparison of Two Distributed Disk Systems" Digital Systems Research Center—Research Report SRC-155, Apr. 30, 1998, XP002368118.

Lee and Thekkath, "Petal: Distributed Virtual Disks", Systems Research Center, Jun. 2009.

PCT International Search Report for PCT App. No. PCTUS05/01542 dated Aug. 25, 2008.

Bruschi and Rosti, "Secure multicast in wireless networks of mobile hosts: protocols and issues", Mobile Networks and Applications, vol. 7, issue 6 (Dec. 2002), pp. 503-511.

"Computer Networking Essentials" Copyright 2001, Cisco Systems, Inc., 2001.

Satran et al. "Internet Small Computer Systems Interface (iSCSI)" IETF Standard, Internet Engineering Task Force, IETF, CH, Apr. 2004, XP015009500, ISSN: 000-0003.

Lee et al. "Petal: Distributed Virtual Disks", 7th International Conference on Architectural Support for Programming Languages and Operation Systems. Cambridge, MA., Oct. 1-5, 1996. International Conference on Architectural Support for Programming Languages and Operation Systems (ASPLOS), New, vol. Conf. 7, Oct. 1, 1996, pp. 84-92, XP000681711, ISBN: 0-89791-767-7.

VMWare Workstations Users Manual, Version 3.2, VMWare, Inc., Copyright 1998-2002.

"Limited distributed DASD Checksum, a RAID Hybrid" IBM Technical Disclosure Bulletin, vol. 35, No. 4a, Sep. 1992, pp. 404-405, XP000314813 Armonk, NY, USA.

Kim et al., "Internet multicast provisioning issues for hierarchical architecture", Networks, 2001, Proceedings, Ninth IEEE International Conference, published Oct. 12, 2001, pp. 401-404.

Satran et al., iSCSI, Internet Draft draft-ietf-ips-iscsi-19.txt. Jun. 2009.

Chavez, A Multi-Agent System for Distributed Resource Allocation, MIT Media Lab, XP-002092534. Jun. 2009.

* cited by examiner

US 7,649,880 B2

SYSTEMS AND METHODS FOR DERIVING STORAGE AREA COMMANDS

This application claims the benefit of U.S. provisional application Ser. No. 60/640,763 filed Dec. 29, 2004 and this application is a continuation-in-part of co-owned U.S. patent application Ser. No. 10/473,713 filed Mar. 3, 2004 and currently pending, which is a national phase of PCT application number PCT/US02/40205 filed on Dec. 16, 2002 which claims priority to provisional application No. 60/425,867 filed on Nov. 12, 2002.

FIELD OF THE INVENTION

The field of the invention is addressable storage areas.

BACKGROUND OF THE INVENTION

Network storage devices require high performance to ensure a user or an application experiences fast response or high data throughput from the storage device. Client computers exchange packets with the storage devices where each packet comprises information directed toward a physical storage area. Typically, the information includes addresses, payloads, commands, or other information relevant to interacting with the storage area. High performance network storage solutions imply the various aspects of the solution should also be high performance including processing protocols, interpreting packet information, command resolution, addressing storage areas, or other aspects.

The faster a network storage solution is able to process networking protocols the higher the performance of the solution. Some storage solutions use stateful protocols including TCP or iSCSI over TCP to communicate with network storage devices. Stateful protocols incur overhead when processing packets at high speeds often times requiring additional support systems include TCP Offload Engines (TOE) to improve performance. As networking infrastructure speeds increase, the overhead on stateful processing places greater demands the processing units to maintain state of a communication link. To alleviate the problem of protocol overhead and to improve performance, a network storage solution could employ stateless protocols. Solutions that employ open standard ATA over Ethernet (AoE) use Ethernet as the stateless protocol. Such solutions offer high performance on communication networks; however, the solutions do not offer addressing schemes that can scale to extended network, for example, a LAN, WAN, or the internet using layer 3 routing.

Constituent storage elements of a networks storage solution including clients, storage devices, proxies, or other equipment, should quickly interpret commands to ensure performance of the solution remains high. Traditionally, solutions employ a command protocol imposed on a communication stack. Again, take for example iSCSI where the SCSI command set tunneled over a TCP/IP connection between a client and storage device. This implies, once a storage element receives packet, it must continue to process the command protocol above and beyond protocol processing. Through proper construction of the network storage solution, packet interpretation can be advantageously accelerated by having the communication link processing take some of the responsibilities. Furthermore, communication link processing can aid in the resolution of storage area commands.

In general, network storage solutions provide explicit identifiers (IDs) associated with a physical storage area. For example, a logical volume of storage based on iSCSI has a logical unit number (LUN), or a NAS system has a path or file name on the NAS file server. However, this imposes a completely separate storage area ID translation layer on top of a communication layer when packets are exchanged over a network. The storage device decodes the ID to determine which physical storage area is the target. For example, a LUN refers to a logical volume; however, storage devices resolve the LUN to a disk or a disk partition as a function of other packet information including a logical block address (LBA) or other payload information. Once the address has been translated, the commands must then be interpreted. Therefore it is advantageous to address physical storage areas utilizing networking infrastructure rather than solely using an explicit address or ID because the network itself can help resolve an address to the storage area. Furthermore, it is also advantageous to use physical storage area addresses to help resolve a command targeting the storage area. For example, if an IP address is used as an address for a storage area, network switches or routers find the storage area by directing network storage packets appropriately without using additional extraneous infrastructure to create the storage fabric. The use of IP addresses as storage area addresses is well addressed in co-owned Zetera U.S. patent applications with Ser. Nos. 10/473,713, 10/473,509, 10/47280, and 10/763,099 which are hereby included by reference in their entirety.

Using externally controlled addresses for storage areas provide advantages of scalability because the addresses of storage areas are not necessarily bound to hardware or to physical location. However, the address space can be quite large. For an IPv4 address, there are over 4 billion addresses that could be assigned to a storage area. For an IPv6 address, there are $3.4 \times 10^{38}$ addresses that could be assigned to a storage area. Without a storage device knowing a priori what addresses are going to be assigned to its storage areas, the storage device might not be able to assume restrictions on the address space resulting the storage device having to search for the correct storage area through the entire address space. For example, if storage devices manage storage areas having IP addresses from multiple subnets spread evenly the full address space; each storage device can not assume limitations on subnets to reduce the search space thereby consuming memory. Therefore, the storage device requires a fast method for resolving a storage area's address to the storage area context where the method balances memory utilization with speed of resolution.

Consumers of network storage have an insatiable need for storage. In the near future one could reasonably expect that all electronic data, communications, content, or other data will be stored for archival purposes and will not be deleted. Therefore, storage addresses should scale with the storage solutions to support nearly seamless increases in capacity, performance, reliability, recovery, or in other critical characteristics. For example, a logical volume represented by a multicast address could store data on a storage area that individually have addresses comprising one or more segments including the multicast address, LBA, port assignment, time stamp, or other information in a network storage packet. Complex addresses loaded with information are difficult to interpret forcing storage devices to consume CPU time that might be precious on cost sensitive storage devices.

Therefore, there remains a considerable need for apparatus and methods to ensure high performance of network storage solutions. High performance network solutions would comprise the following beneficial elements:
  Exchange packets between storage elements and storage areas using a stateless protocol
  Modules use addresses within the packets to quickly derive storage area commands without requiring a file system

SUMMARY OF THE INVENTION

The present inventive subject matter is directed toward storage systems where clients exchange data with physical storage areas using a stateless protocol. In one embodiment, clients and storage areas exchange packets that have addresses and payloads. Modules use the addresses to derive storage area commands that are understandable by the controller. The controller issues the command to resolve the final disposition of the packets payload. Furthermore, the controller does not require the use of file systems to interact with the physical storage area. In another embodiment, packets have different addresses for the physical storage area where the modules derive different commands as a function of the different addresses. In some embodiments the different addresses comprise different lengths. In yet other embodiments modules derive the storage area commands through employing lookup tables indexed by portions of the addresses.

Alternative embodiments of the inventive subject matter are directed toward methods of deriving storage area commands. The methods include exchanging packets with physical storage areas using a stateless protocol wherein the packets comprise addresses and payloads. Additionally, the physical storage areas have controllers. Addresses are translated to into storage area commands that are understood by the controllers to, determine the final disposition of the packets or the payloads. The controllers understand the commands without requiring the use of file systems to interact with the physical storage areas. In some embodiments, the step of translating addresses to storage area commands includes associating the addresses with contexts of the physical storage areas. In yet other embodiments, addresses split into portions to be used in a search of the contexts. Contemplated searches include those that use lookup tables, especially those using the portions as an index into the tables. In especially contemplated embodiments, the searches employ variants of router address lookup algorithms. Especially contemplated router techniques involve searches using variants of multi-bit tries, binary trees, recursive flow classification, PATRICIA, or other router address lookup techniques.

Network storage devices provide clients access to physical storage areas over a network. A physical storage area comprises a medium for storing data including rotating or non-rotating media. Examples of rotating media include hard disk drives, CDs, DVDs, or other rotating media. Example of non-rotating media includes RAM, flash, ROM, USB thumb drive, or other non-rotating storage media. A physical storage area represents a physical unit of storage where data is physically placed for storage on a storage device. Examples of physical storage areas include, but are not limited to, a volume, a group of partitions, a partition, a disk drive, or a data block on a storage device. Each physical storage area comprises a context that represents the characteristics of the storage area to be used when modules interact with the storage area. The storage device uses the characteristics to determine the disposition of packets or the packets' payloads with respect to the physical storage area. Characteristics advantageously include storage area address, network address, ID, name, starting LBA, size of storage area, storage area attributes, or other information useful when processing network storage packets.

GLOSSARY

The following descriptions refer to terms used within this document. The terms are provided to ensure clarity when discussing the various aspects of the inventive subject matter without implied limitations.

The term "context" herein means information relating to a physical storage area end-point of a communication link. A context is not a connection point as in the concept of TCP here a connection is represented by a persistent set of IP address and port pairs. A context can comprise a network address, or even a port assignment; however, the information is persistent for only one end of the communication link. Furthermore, a context can also include additional information relating to the final destination of a communication link including a physical storage area end-point. For example, if a physical storage area comprises a network addressable storage partition, the partition's context could include a partition address, partition size, authentication data, data transfer size, stripe block size, partition name, pointers to a datagram comprising a storage protocol message, file locks, or other information relating to the partition. Network storage devices use the context information to determine the final disposition of a packet or the packets payload. Furthermore, a module in a storage device uses the context to derive a storage area command.

The term "packet" herein means a unit of data including payload data and control data. Examples of packets include Ethernet frames, IP fragments, or datagrams. A tunneled protocol message is not a packet; however, the message or a fragment of the message coupled with the header information is a packet wherein the header information represents control data. Therefore a network storage packet comprises network storage information and the header information wherein the header information is used to convey the network storage packet from one network enabled entity to another. An iSCSI command or message is not a packet because it does not include information from the framing datagram.

The teachings herein may be advantageously employed by developers of network storage solutions, network storage devices, devices that use network storage, or software that interacts with network storage. Fast resolution of storage area commands from packets improves performance of network storage equipment. It is contemplated the inventive subject matter advantageously integrates into modules within network storage equipment. Contemplated equipment includes interface cards, hardware modules, integrated circuit chips, field programmable logic arrays (FPGAs), application specific integrated circuits (ASICs) or other modular devices.

Various objects, features, aspects, and advantages of the present invention will become more apparent from the following detailed description of the preferred embodiments of the invention, along with the accompanying drawings in which like numerals represent like components.

DETAILED DESCRIPTION

The following detailed description presents example embodiments of network storage systems; however, it is contemplated the inventive subject matter can be advantageously deployed within other markets beyond network storage systems. For example, markets that employ disaggregated devices whose device elements are network attached could benefit from systems similar to the example embodiments presented below. Therefore, the following example embodiments are presented for clarity and are to be interpreted to their broadest extent without implied limitation to the storage market.

Overview

Figure 1A:
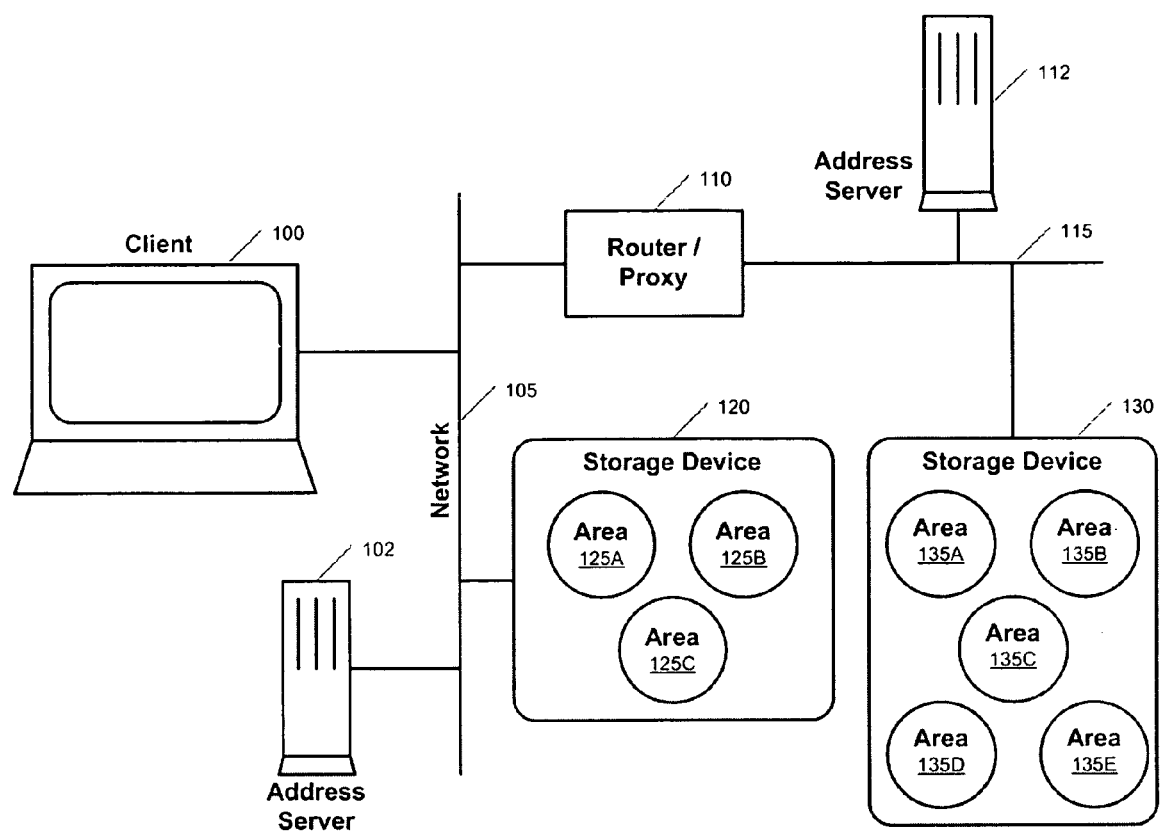
FIG. 1A represents a possible embodiment of a network storage system where clients access physical storage areas.

FIG. 1A represents a possible embodiment of a network storage system where a client accesses physical storage areas. One or more of client 100 connects to network 105 or network 115 through router/proxy 110 to access storage devices 120 or 130. Although two networks are shown in the example, all network topology falls within the scope of the inventive subject matter including LANs, WANs, WLANs, mesh networks, ad-hoc networks, intranets, internets, VPN, or other networks. Storage device 120 comprises one or more storage areas 125A through 125C and storage device 130 comprises one or more storage areas 135A through 135E. The term "storage area" as used herein should be interpreted broadly to include physical storage areas. In a preferred embodiment, client 100 exchanges packets with a plurality of storage areas on one or more storage devices. It is contemplated that storage device 120 or 130 acquire network addresses from address servers 102 or 112, respectively, possibly using DHCP. Preferably, storage device 120 or 130 acquires multiple network addresses that are assigned to storage areas 125A through 125C or 135A through 135E. Other address acquisition mechanisms are also contemplated including using Auto-IP or statically assigned addresses.

Client 100 broadly represents a system that access network storage by exchanging packets with storage areas. The term "exchanges" as used herein means the client is addressing packets to the physical storage area. Contemplated clients include general purpose computing devices or specific computing device. Examples of general purpose computing devices include computer systems comprising operating systems (Windows® or Linux™ for example) possibly running applications that use storage. Specific computing devices include, but are not limited to, digital video recorders, personal video recorders, music players, game consoles, cameras, or other devices that utilize storage. In some embodiments, client 100 could also operate as a storage device with appropriable software or firmware designed to provide other clients access to the storage areas of client 100.

Client 100 communicatively couples to other devices including storage device 120 or router 110 over network 105. Client 100 could employ a static network address; however, it could also obtain a network address from address server 102, a DHCP server for example. Network 105 transports network storage packets from client 100 over a wired or wireless media to storage device 120 or router 110. Examples of wired media include Ethernet, Firewire, USB, or other forms of wired transport. Examples of wireless media include 802.11, WiMAX, IrDA, Bluetooth, or other forms of wireless transport. Preferably, client 100 and storage device 120 communicate using well established standards, for example using a packet switched network based on an internet protocol, IPv4 or IPv6 for example. Additionally, in a preferred embodiment, client 100 exchanges packets using a stateless protocol. Example stateless protocols include IPv4, IPv6, UDP, HTTP, Ethernet, or other protocols that do not require persistent connection information from previous packets or messages to operate.

Storage device 120 or 130 broadly represents the myriad of possible network storage devices. Examples of storage devices include network enable disk drives, enclosures supporting one or more disk drives, storage arrays, rack mount chassis, computers running software or firmware drivers to provide access to the computer's storage resources, optical drives, flash based media, or other devices that provide network access to storage media. Storage device 120 or 130 comprises a combination of hardware, software, or firmware designed to manage or control storage areas 125A through 125C or 135A through 135E. In other embodiments, storage device 120 or 130 could also comprise cameras, digital video recorders, personal video recorders, music players, or other systems providing access to stored data. In yet another embodiment, storage devices are contemplated to include disaggregated elements including router 110 operating as a proxy, or other devices that facilitate resolving storage area addresses.

Storage areas 125A through 125C or 135A through 135E comprise physical storage areas. Physical storage areas include disk drives, partitions, CDs, DVDs, RAM, flash, or other physical storage media. Logically, each storage area is represented by a context that describes the characteristics of the storage area. Therefore, each storage area could comprise a single data block addressable on physical storage area (via an LBA for example), a partition, a group of partitions, a disk, a logical volume, a collection of volumes, or other logical representation of a storage area. In a preferred embodiment, storage areas 125A through 125C or 135A through 135E are able to combine to form an aggregated logical storage device across the network topology from the perspective of client 100.

In a preferred embodiment, clients exchange packets with physical storage areas. The packets address the physical storage areas through the use of an address that could comprise a variable length. Storage devices use the address to aid in the derivation of a command directed toward the storage area.

Each storage area is addressed through an address that could be of variable length. For example, when client 100 interacts with storage area 135C, it sends a network storage packet with the address of area 135C. Router 110 receives the packet through normal network operation and routes the packet to storage device 130. Storage device 130 interprets the address for storage area 135C, derives a storage area command possibly as a function of searching for the context of storage area 135C. In one embodiment, the variable length address comprises a network address, an IP address for example. In an alternative embodiment, the variable length address comprises other fields as well, possibly including an LBA, port assignment, a dedicated field in the packet, quality of service (QoS) information, or other information in the packet that can be used to address storage area 135C.

In an alternative embodiment storage device 120 or 130 could coexist with infrastructure that is sensitive to the addresses of storage areas 125A through 125C or storage areas 135A through 135E. For example, router 110 could act as a proxy for storage device 130 in a manner that is transparent to client 100. For all intents and practical purposes in this example, client 100 perceives router 110 as a storage device. Consequently, all distributed storage device infrastructure and associated addressing schemes fall within the scope of the inventive subject matter.

Figure 1B:
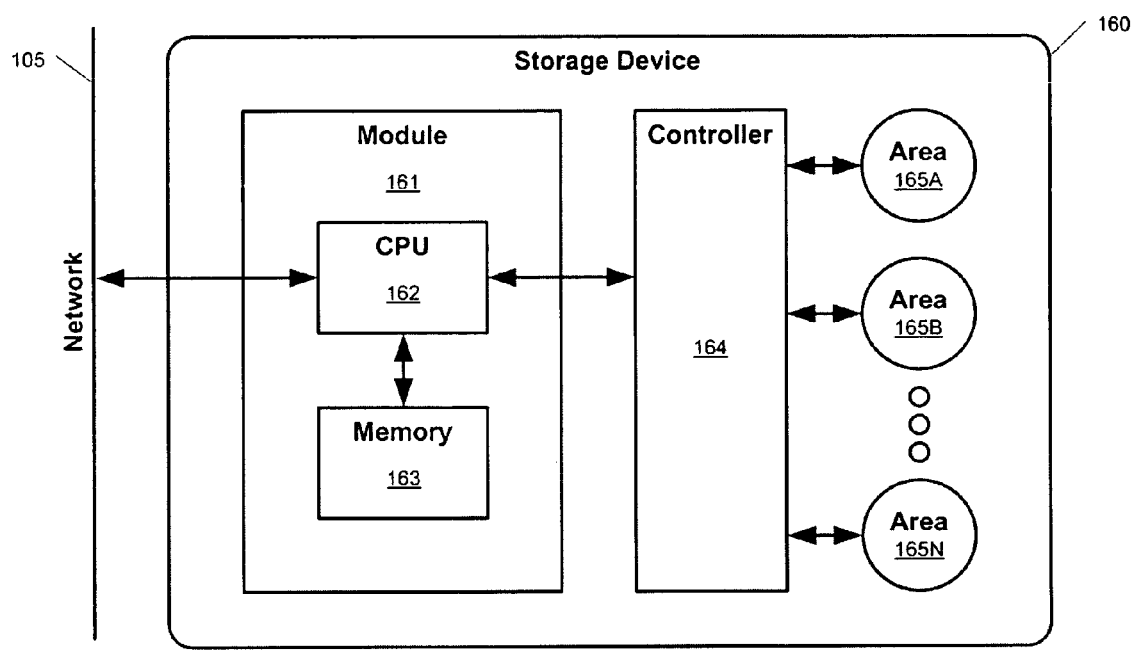
FIG. 1B represents a possible embodiment of a storage device responsible for physical storage areas.

FIG. 1B represents a possible embodiment of a storage device responsible for physical storage areas. In one embodiment storage device 160 comprises module 161 and controller 164. Module 161 interacts with network 105 by receiving or sending network packets. Module 161 utilizes CPU 162 to execute instructions stored in computer readable memory 163 as it fulfills its responsibility for interfacing between client 100 and one or more storage areas as represented by storage areas 165A through 165N. Module 161 comprises at least one of or a combination of software, hardware, or firmware. Module 161 accepts packets from network 105 and interprets the information in the packet to determine the final disposition of the packet or the packet's information with respect to the target storage area. The final disposition includes deriving a storage area command that controller 164 understands. Controller 164 executes the command to interact with the target storage area. Contemplated storage area commands include reads, writes, seeks, status, monitor, alters, logging, events, inventory, recovery, reporting, or other commands that are understandable by controller 164. An example command sets include SCSI, SMART, ATA, or other hard disk drive commands.

In a preferred embodiment module 161 comprises firmware in an enclosure that supports one on or more disk drives. The firmware includes an operating system, a communication stack (e.g TCP/IP, UDP/IP, or others), or other firmware components to support an application running on the enclosure. Furthermore, it is contemplated that one or more of module 161 could exist in storage device 160. Two modules could share CPU 162 or memory 163 as they function. In addition one or more modules can communication with controller 164.

Module 161 comprises a set of core responsibilities. It is contemplated that the core responsibilities include interacting with a network, interpreting packets, deriving commands for controller 164, issuing commands to controller 164, receiving data from controller 164, forming responses to client 100, or other responsibilities that facilitate the operating of storage device 160. Furthermore, module 161 can advantageously operate as one or more tasks or threads within an operating system as the module fulfills its responsibilities. As module 161 operates it consults storage area contexts, possibly stored in memory 163 associated with module 161, to resolve the final disposition of packets.

In a preferred embodiment controller 164 represents firmware and hardware connected to an element of storage, a disk drive for example. Controller 164 receives commands issued from module 161 and executes the commands targeting one or more storage areas 165A through 165N. In an especially preferred embodiment, controller 164 represents firmware issuing disk commands over an ATA interface. It is contemplated that an embodiment could include one or more of controller 164. For example, a rack-mount chassis supporting 16 disk drives could comprise four controllers where each controller is responsible for four disks. Controller 164 receives storage area commands from module 161 wherein the commands represent block oriented commands. Therefore, controller 164 does not require the use of a file system to interact with the storage area. In a preferred embodiment, the commands are independent of the data context and a file system, if any, resides remotely to storage device 160.

As module 161 interprets packets from client 100 targeting a storage area, in a preferred embodiment, module 161 uses the packet's address information to help derive a command given to controller 164. Ordinarily, network storage systems interpret only the contents of a packet to find commands; however, in a preferred embodiment the address itself comprises information to be used in the derivation of the storage area command. For example, a storage area could have multiple addresses where each address represents a different type of command for a storage area as discussed more fully below.

Although module 161 and controller 164 are shown as two entities within storage device 160, one should be mindful that these entities represent functionality associated with storage device 160. Therefore, embodiments that combine the two entities together, add additional capabilities, or arrange them differently with respect to storage device 160 also fall within the scope of the inventive subject matter. For example, controller 164 could represent hardware added externally to the enclosure of storage device 160. An alternative example includes a hard disk drive adapted to include module 161 and controller 164 wherein the two entities are indistinguishable.

Figure 1C:
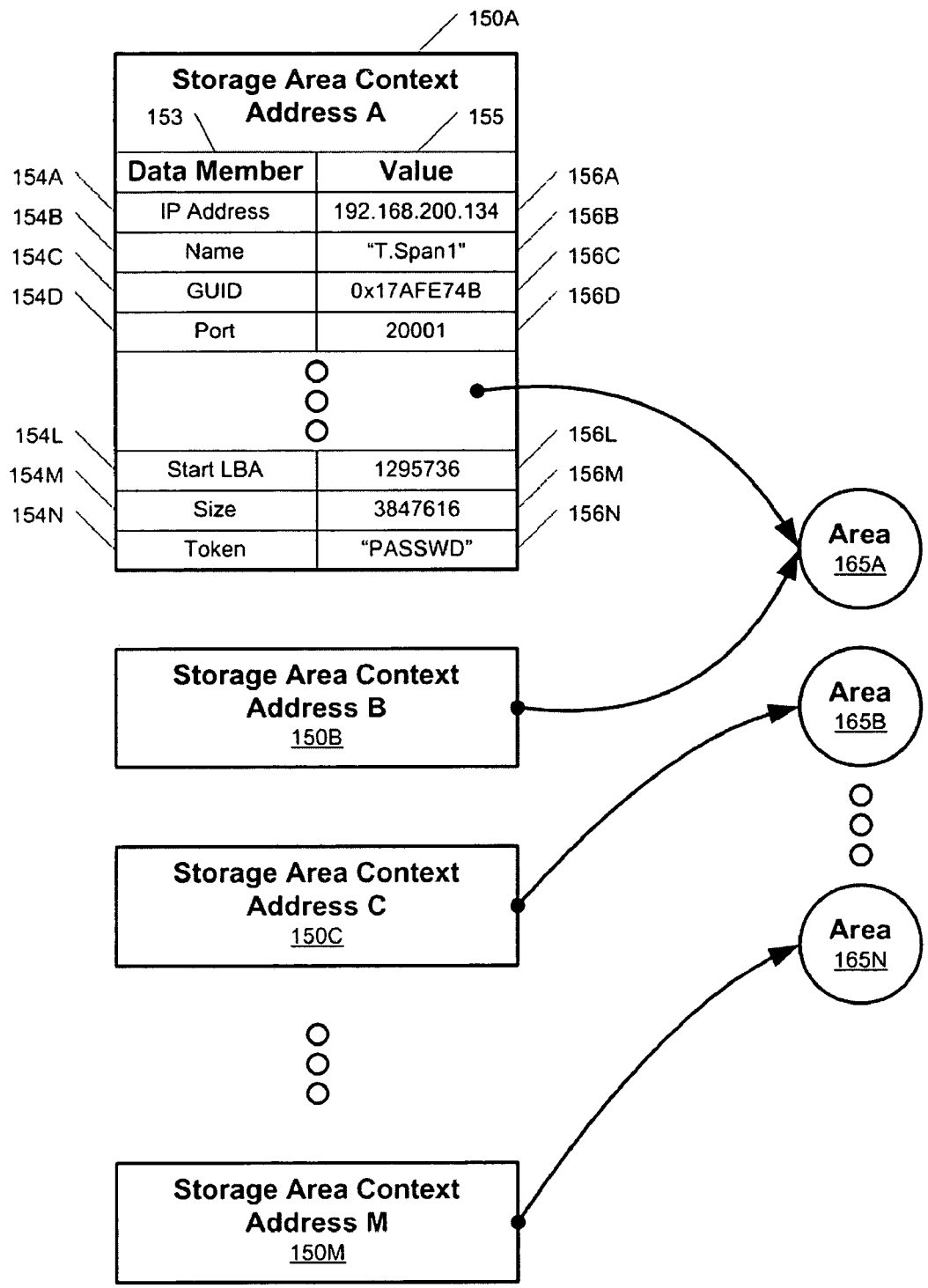
FIG. 1C represents a possible embodiment of storage area contexts associated with physical storage areas.

FIG. 1C represents a possible embodiment of a storage area context stored in a computer readable memory. One or more storage area contexts 150A through 150M reside in a computer readable memory associated with a module of a storage device. Computer readable memory could include RAM, flash, ROM, disk drive, or other data storage media. As an example of a storage area context, contexts 150A comprises a plurality of data members 154A through 154N listed in column 153 with values 156A through 156N in column 155. Contemplated data members include network address, a name of the storage area, a unique identifier, a starting LBA if the storage area is a partition on disk, the size of the storage area, authentication tokens, port assignment, logical to physical LBA mapping, or other information necessary to represent to allow a module to derive storage area commands understandable by a controller. A storage device uses values 156A through 156N while managing, controlling, or interacting with the storage area. For example, as a storage device receives network storage packets, a module within the storage device interprets the packet, including the address, and finds the context associated with the target storage area. The module uses the context information to issue commands to a controller. If the storage area is a partition on a disk drive, then the module uses a start LBA with an offset possibly stored in the packet to derive a command that the controller can execute. Contexts are also contemplated to comprise tasks or threads in some embodiments where each task or thread could represent the storage area virtually from a client's perspective.

Storage area context 150A and 150B illustrate an embodiment where one or more contexts can associate with a single storage 165A. The context aids a module in the storage device to derive how to interact with the target storage area. For embodiments where a storage area has more than one address, there will be at least one context to describe how the module should derive storage area commands. Furthermore, two contexts, each associated with a different address, can indicate to the module that packets using the different addresses should be handled differently.

Storage Area Addresses

Figure 2A:
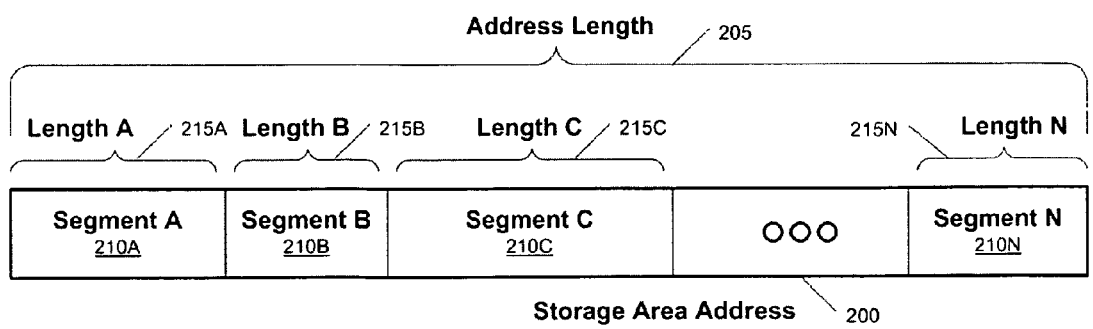
FIG. 2A represents a possible schematic of a storage area address.

FIG. 2A represents a possible schematic of a storage area address. Storage area address 200 comprises one or more segments 210A through 210N each with a length 215A through 215N, respectively. Address length 205 represents the total length of address 200. Additionally, it is contemplated the sum of lengths 215A through 215N is less than or equal to address length 205.

Preferably address 200 comprises a bit pattern where each of segments 210A through 210A also comprises a bit pattern. Therefore, the length of address 200 or segments 210A through 210N can be measured in bits. For example, if address 200 only includes a single 32-bit segment, an IPv4 address for example, address length 205 would be 32 bits.

Contemplated segments 210A through 210N have well understood meaning from the perspective of a client, intermediary storage device, or a storage device. As clients access storage areas, the client forms packets having information including one or more of segments 210A through 210N to address the storage area. Examples of segments include IP addresses, partition tags, port assignments, QoS information, packet headers (traffic, time to live, etc. . . . ), or other addressing information that corresponds to a storage area.

Theoretically, address length 205 could be any length; however, the length is bound by practical limitations including packet size. In a preferred embodiment, address length 205 is less than or equal to 256 bits. A 256-bit address provides for a 128-bit IPv6 address along with another 128 bits for alternative uses. Specifically contemplated address lengths include 8, 16, 24, 32, 48, 64, 96, or 128 bits based on various combinations of IP addresses, MAC addresses, port assignments, protocol header fields, partition tags, commands, or other fields that could be used for a storage area address.

Modules within storage devices use addresses to resolve a context for the target storage area to derive a storage area command. In a preferred embodiment the storage device uses both an address and a payload to derive a command. However, it is also contemplated that a storage device could rely only on the address information to derive a command without the payload information. For example, a UDP destination port could equate to a specific command. In addition, it is contemplated a command could be derived without the use of a context from the address.

Variable Address Lengths

Because address 200 can comprise different segments 210A through 210N, address length 205 can vary from one storage area to another. For example, storage device 120 could use only IP addresses to address storage areas 125A through 125C whereas storage device 130 could use a single IP address coupled with a port assignment to address storage areas 135A through 135E. In the first case, storage areas 125A through 125C each have a 32-bit address and in the second case storage areas 135A through 135E each has a 48-bit address. In a preferred embodiment, storage device 120 or storage device 130 run the same software or firmware code. The code understands the particulars of the addressing scheme as determined by the IT manager, equipment, networking topology, or other factors that affect addressing. Furthermore, the code is contemplated to support multiple addressing schemes to provide interoperability between storage devices via constructing appropriate context resolution methods to derive storage area commands as described below.

Dynamic Address Lengths

In other embodiments, storage area addresses have dynamic length where the address has no a priori fixed length for all storage areas. Contemplated scenarios include distributed storage systems having multiple layers of communications among storage devices, including using proxies, where each layer is responsible for one segment of address 200. Furthermore, each contemplated layer in the storage system might not know the total length of address 200, but rather only their individual segment. This approach aides in resolving a context of a storage area by allowing each subsequent layer of the communication infrastructure to direct packets to the next layer without having to be aware of the next layer's responsibilities. A reader skilled in the art of programming will recognize the layered approach is moderately similar to processing stack data structures with the exception that the address segments on the address stack are not necessarily popped off (or pushed on), but interpreted en situ. However, it is also contemplated that dynamic address segments could be added or removed from a storage packet as it passes through the communication infrastructure as part of the process of resolving the context of the target storage area. Adding or removing address segments provides for scaling a storage solution by introducing layers that are transparent to the client or end-node storage devices. Therefore, using addresses as part of command derivation allows the communication infrastructure to accelerate packet processing.

Static Address Lengths

In yet another embodiment, storage area addresses have a static length where address length 205 is less than or equal to the maximum length of the address. Contemplated advantages include allowing two similar storage devices to use different address lengths up to the maximum value. For example, storage devices using 32-bit IP addresses coupled with a 32-bit partition tag use a static address length of 64 bits. A first storage device representing an enclosure supporting two disk drives might use only 16 bits of the 32-bit partition tag because 65,000 partitions are accessible or are reasonable. A second storage device based on the same code base supporting 16 disk drives might use 24 bits of the 32-bit partition tag because a 16 bay device could be partitioned into 16 million partitions. Unused parts of the static length address field are contemplated to padded or zeroed. Static addresses can also be compared to stack data structure processing with the exception that address segment fields are added or removed during resolution of the storage area contexts during derivation of storage area commands.

Multiple Addresses

Another aspect of address 200, a storage area could be addressed by multiple addresses. Storage areas existing behind proxies could be addressed locally through one addressing scheme, by local subnet IP address for example; and could be addressed remotely through another addressing scheme, by a single IP address with a port assignment for example, when the proxy acts as a NAT router. In addition, support for multiple addressing schemes advantageously addresses situations where IP addresses for storage areas are in short supply. Consider the situation of a storage device comprising a complex logical volume with over one hundred storage areas. The storage device would consume over one hundred addresses from a DHCP server. If the server only supports a class C subnet where only 265 addresses are available, then the storage device would limit the number of other hosts using the network. Therefore providing proxy or NAT capabilities along with multiple addressing allows IP addresses to be conserved.

It is contemplated that clients could also use multiple addresses to preferentially select how a storage device treats the client's requests. When a client sends packets to a storage area, the client could alter the value of a segment in the address to specifically describe its intent. For example, consider a logical volume comprising a heterogeneous mirror where one side of the mirror provides fast read capabilities and the other mirror archives data. A client could address the logical volume via one IP address, possibly a multicast address, to write data so it is written to both the fast read side and the archived side. The client could then address the fast read side of the mirror through a different IP address. When the storage devices receive the packets, they resolve the context of the storage areas as a function of the addresses, and then derive appropriate storage area commands for the packets as determined by the contexts. Yet another example includes a client setting a QoS value for the packets, perhaps to ensure solid content delivery for a stored video stream, which the storage devices use to handle the packets appropriately.

Addresses within Network Storage Packets

As clients interact with storage devices, the clients form packets and are contemplated to embed one or more address segments within the packet to indicate which storage area is the target for the packet. Storage devices interpret the segments to resolve the context of the storage area.

Figure 2B:
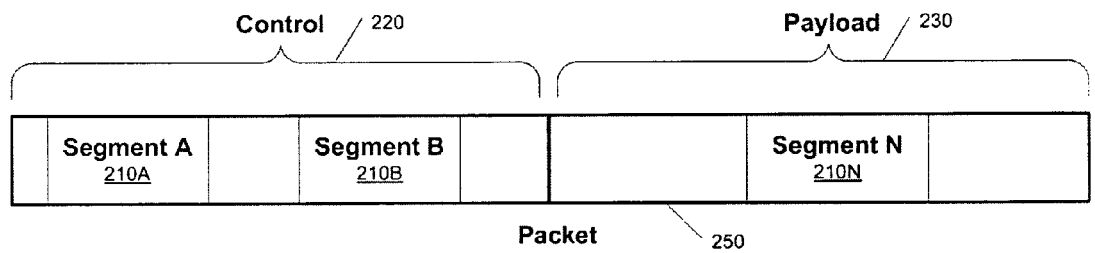
FIG. 2B represents an embodiment of a network storage packet.

FIG. 2B represents a possible embodiment of a packet comprising a storage area address. Packet 250 is contemplated to comprise a control part 220 and a payload part 230. One or more address segments 210A through 210N reside among control part 220 or payload part 230. Control part 220 comprises control information used by communication infrastructure to properly handle the packet as it passes from a client to a storage area. Examples of control information include packets headers, packet framing information, or other fields. In a preferred embodiment control part 220 comprises IP or UDP headers; however, other framing information is also contemplated including TCP, Ethernet, or HTTP headers. Payload part 230 represents data or command information exchanged between a client and a storage device. Examples of data or command information include data to be written to storage, commands to read from the storage, or other network storage protocol commands.

Figure 2C:
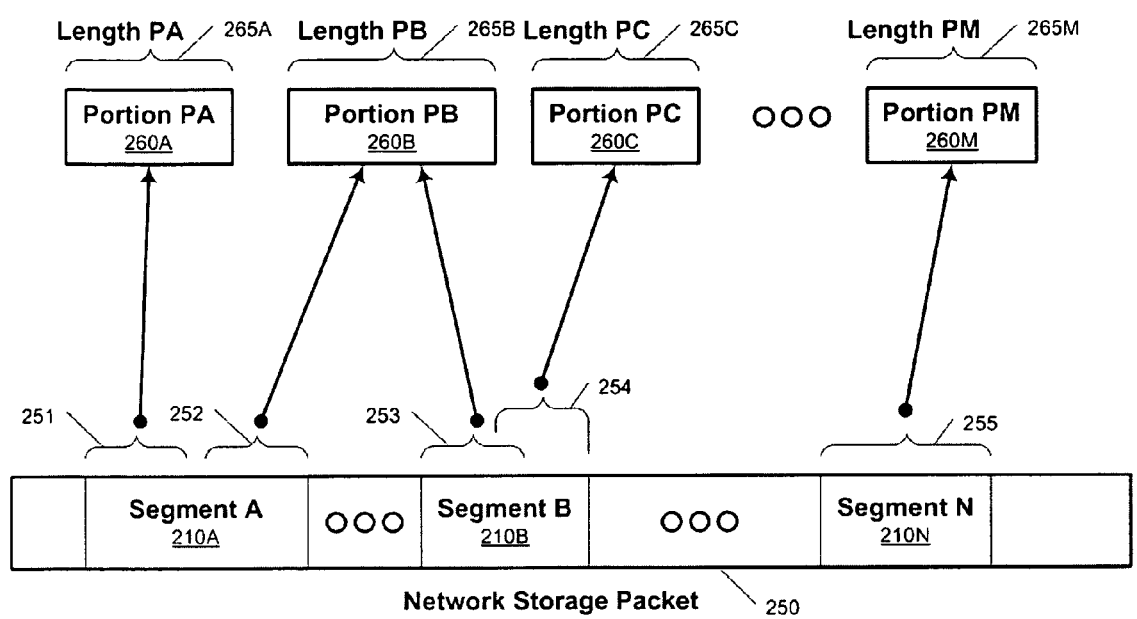
FIG. 2C represents a schematic of a packet comprising a storage area address wherein the address splits into portions.

FIG. 2C represents a possible packet comprising a storage area address that splits into portions. Packet 250 comprises one or more address segments 210A through 210N that compose an address of a storage area. The storage device that is responsible for the target storage area interprets segments 210A through 210N and constructs portions 260A through 260M that represent parts of address 200. The term "portion" herein means an encoding of a fraction of an address. A portion could be a bit pattern from the address segments or an encoding of the bit pattern of the segments. Portions 260A through 260M are constructed to advantageously reduce the searching required for a context. Address portions 260A through 260M having lengths 265A through 265M. Each length 265A through 265M has an aggregate length less than address length 205. The aggregate length is the sum of the bits composing the portion no matter the source of the bits. Portions 260A through 260M are advantageously constructed to resolve a storage area's context quickly while deriving storage area commands.

Portions 260A through 260M have several characteristics that should be noted. The sum of lengths 265A through 265M do not necessarily exactly correspond to address length 205 because portions 260A through 260M do not necessarily correspond to segments 210A through 210N. A storage device can employ one or more of portions 260A through 260M to resolve a context. Furthermore, the each individual length of a portion does not necessarily correspond to a length of a segment.

The following examples illustrate how portions are associated with segments without limitation to the stated examples. All constructions of portions from a storage area address are contemplated to fall within the scope of the inventive subject matter.

Portions Comprising Split Segments

Portion 260A represents section 251 of segment 210A showing that portion 260A has the bit pattern associated with the section 251. In addition, section 252 of segment 210A contributes to portion 260B. Examples of this scenario include using the first 16-bits of an IP address as portion 260A. Under this scenario, portion 260A could be used as an index into a lookup table to resolve a context. Subsequent sections of segment 210A could also be used in additional tables to ultimately resolve contexts as shown in later in FIG. 4.

Portions Comprising Multiple Segments

Portion 260B comprises section 252 of segment 210A and section 253 of segment 210B showing portion 260B could have the bit pattern associated with both sections. It is contemplated, that both sections could be interpreted in a manner that results in portion 260B having a bit pattern different than the combined patterns of section 252 and 253. An example of a portion having multiple segments includes using a port assignment from segment 210B with the second 16-bits of IP address in segment 210A. Advantages for this scenario include quickly differentiating storage areas on the same subnet by how they are accessed via the port assignment, for example using even ports for reads or odd ports for writes. Firewalls can then advantageously enhance storage devices through blocking ports, possibly to a read-only storage area by blocking write ports.

Portions Comprising Overlapped Segments

Portion 260C comprises section 254 which overlaps with section 253. It is contemplated storage devices combine address information into a form that can be used to search for contexts quickly. For example, segment 210B could comprise an IP header having time to live, protocol, checksum, source address, or destination address. As an example, sections 254 and 253 share protocol information in an IP header. Two or more portions are therefore able to share parts of the address. For example, the storage device could use the protocol field in the IP header to quickly differentiate storage area management traffic over TCP with storage area data traffic over UDP all destined for the same storage area rather than using a port assignment which could introduce extra processing by a communication stack.

Encoding Segment Bit Patterns into a Portion

In one possible embodiment a storage device will encode a segment's bit pattern. For example, if section 255 representing segment 210N comprises a 16-bit destination port assignment then portion 260M could have over 65,000 values. However, if the storage device only has four valid ports available for example, it is advantageous for portion 260M to only have four values; therefore, portion 260M could be represented by an 8-bit value or a 2-bit value if the data is packed efficiently in memory. By encoding a segment's bit pattern, memory can be conserved or the speed of resolving a contested can be increased. Encoding a segment into a portion implies some use of computation. In a preferred embodiment, a storage device encodes a segment to reduce memory usage or to increase performance. In a more preferred embodiment, the encoding can be prepared before runtime to reduce computation overhead.

Searching for Contexts as a Function of Storage Area Addresses

Once a storage device interprets address segments and constructs portions of the storage area address, the storage device starts to resolve the storage area context while deriving a storage area command. Quick resolutions of contexts are advantageous for protocols because a storage device can bypass a normal communication stack. Bypassing the communication stack eliminates unnecessary general purpose packet processing that is not germane to deriving the storage area command. In a preferred embodiment contexts are resolved as close to the physical network layer as is reasonable to eliminate as much processing by the upper part of the communication as possible. In a more preferred embodiment, packets are transferred using stateless protocols including UDP which have low processing overhead. Once a context has been resolved, storage area commands can be derived and issued to a controller for execution.

Lookup Tables

Figure 3A:
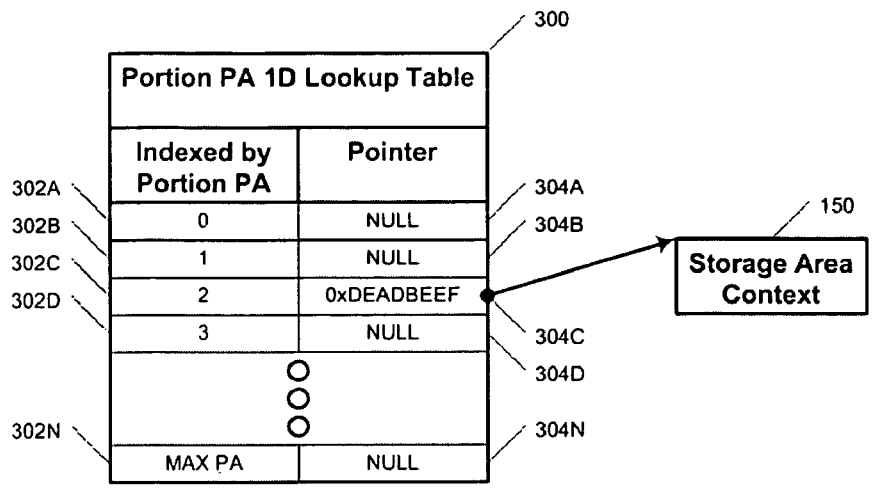
FIG. 3A represents a possible direct lookup table for finding a storage area context from a portion of a storage area's address.

FIG. 3A represents a possible direct lookup table for finding a storage area context from a portion of the storage area's address. For simple addresses comprising a single segment or a single portion allow a storage device to quickly resolve contexts, possibly through a direct lookup table. For example, direct lookup table 300 comprises one or more indices 302A through 302N that reference pointers 304A through 304N. Lookup table 300 is very efficient if the maximum value of portion 210A is small, 8-bits for example. An 8-bit value implies lookup table 300 would comprise 256 entries. Each entry either references a context, possibly through a pointer, or doesn't reference a context, possibly having a NULL value. For example, if portion 210A has a value of "2," the table indicates storage area context 150 resides at memory location 0xDEADBEEF, assuming a 32-bit address space. Only one lookup is required to find the context; therefore the order of the search time is O(1). Although direct lookup tables are very fast, the tables can be very inefficient in memory consumption.

Figure 3B:
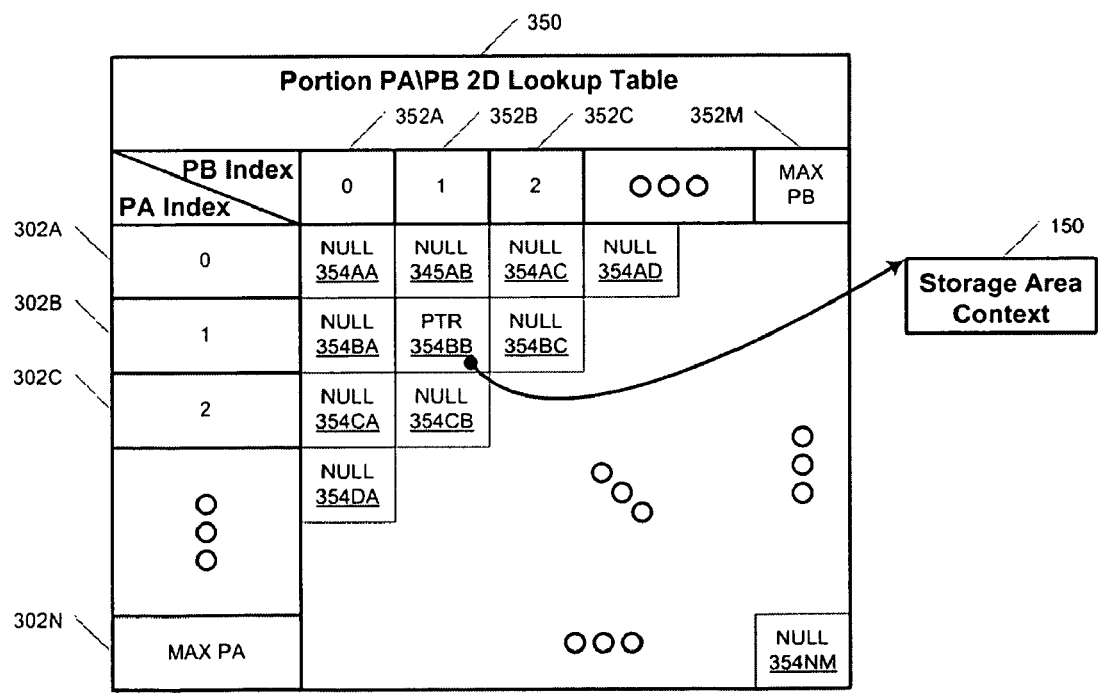
FIG. 3B represents a possible doubly indexed lookup table for finding a storage area context from two portions of a storage area's address.

FIG. 3B represents a possible doubly indexed lookup table for finding a storage area context from two portions of a storage area's address. Lookup table 350 is indexed by portions 210A and 210B through one or more indices 302A through 302N and 352A through 352M, respectively. The array's values are in elements 354AA through 354NM. Just as in table 300, if a context exists for the address, the element points to storage area context 150, otherwise the element has a NULL value. For example, if portion 210A has a value of "1" and portion 210B has a value "1," element 354BB points to storage area context 150.

Direct lookup tables offer very fast resolution of contexts; however, storing elements for all possible addresses, segments, or portions consumes considerable amount of memory. Addresses based on IPv4 addresses comprise at least 32 bits which would require a table with over 4 billion entries and IPv6 addresses are astronomically larger. For small storage devices including cameras, game systems, or other consumer electronics, memory is limited. Furthermore, if resolution of contexts is done through pure calculations, possibly through hash tables, then considerable CPU bandwidth is consumed. Therefore, resolving storage area contexts from storage area addresses balance memory utilization with speed of resolution.

Lookup tables are advantageously employed when they are used as intermediary steps to resolving contexts. All lookup tables are contemplated including those using more then one portion as an index.

Tries

Tries represents lookup tables based on a portion of a value where a first portion of a value is used as an index into a table. The entry for the first portion points to a NULL value if no entries are available or points to an additional lookup table. Each subsequent lookup further refines the search for the final context. This reduces the overall memory consumption of a large lookup space by increasing the number of memory lookups. Multi-bit tries are often used as router tables in routers to process and forward packets quickly.

Figure 4:
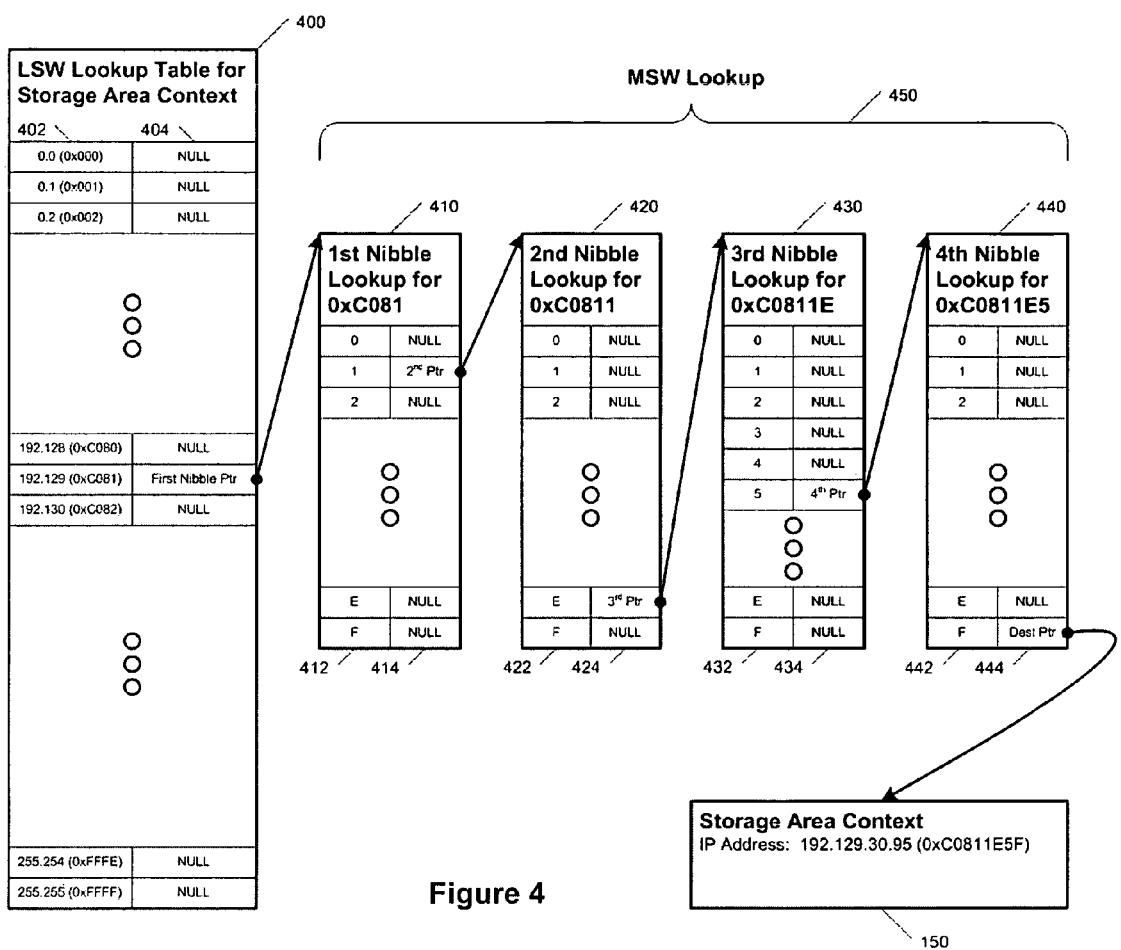
FIG. 4 represents an example of a possible use of a multi-bit trie lookup tables to resolve a storage area context from the storage area's IP address.

FIG. 4 represents an example embodiment of a possible use of a multi-bit trie lookup table to resolve a storage area context from the storage area's address. In a preferred embodiment, a storage device could support 1000's of addressable storage areas each with their own context. In the case where each storage area has an address comprising an IP address, for example, each address could belong to a different subnet depending on the role each storage area fulfills. The complexity of the storage area address space becomes quite high when a storage device is behind a NAT router or where the storage device could be responsible for addresses from an entire class C, B, or even a class A network.

In a preferred embodiment, when a storage device receives a packet comprising a storage area address, the storage device checks for the address of the storage area and constructs suitable portions from the address segments. The example shown in FIG. 4 shows the first portion of the address represents the least significant word (LSW) of the address and consults lookup table 400. Lookup table 400 comprises a table of pointers represented by column 404 indexed by the values in column 402. In the example shown, there is an entry in the table for each of the possible 65536 entries for the 16-bit LSW of an IP address. For example, if a storage packet references IP address 192.128.5.32, the storage device checks the entry corresponding to the 16-bits representing "192.128" having a hex value of 0xC080 which has a NULL entry. In most cases, column 404 will have NULL pointers indicating there is no storage area context. However, in cases where there is an entry, the pointer in column 404 the entry points to a smaller lookup table that only exists when there is a target storage area context. The most significant word (MSW) lookup 450 comprises using tables 410, 420, 430, and 440. Each of these tables represents a lookup for a portion having a nibbles worth of an address where each table has indices as represented by columns 412, 422, 432, and 442 respectively and pointer entries in columns 414, 424, 434, and 444, respectively.

Further consider the example shown in FIG. 4 where a storage device receives a packet with a network address of 192.129.30.95 assigned to a storage area. First the storage area finds the index based on the 16-bit portion represented by "192.129" (a value of 0xC081) for lookup table 400. The storage device finds a pointer to table 410 which comprises indices in column 412 and entries in column 414. The next portion having a nibble of the address is 0x1 ("30" in hex is 0x1E). Entry 0x1 comprises a pointer to table 420 which comprises indices in column 422 and entries in column 424. The next nibble portion of the address is 0xE, whose entry in table 420 has a pointer to table 430. The next nibble portion of the address is 0x5 ("95" in hex is 0x5F). The 0x5 entry in table 430 points to table 440. The 0xF entry table 440 points to destination context 150.

Assuming a 32-bit pointer value, lookup table 400 consumes 256 KB of memory. Each subsequent table consumes 64 bytes of memory. For small storage devices that are cost sensitive and require performance, the lookup tables 400, 410, 420, 430, and 440 offer very fast context resolution performance at some expense in memory. In larger enterprise systems, it is contemplated greater performance is required so the tables can be modified for greater speed. For systems that have severe memory constraints, contemplated restrictions on lookup table 400 include representing only a subnet rather then an entire address range. For example, table 400 could include only entries for non-routable IP addresses similar to "192.128.xxx.yyy" which could reduce the need for additional lookup tables.

All lookup tables that use a portion of the address and an index are contemplated. If an address has Y bits, then it is contemplated that a lookup table can employ X bits of the Y bits. In cases where X is less than Y, specifically contemplated pairs of (X, Y) include (4, 32), (8, 32), (16, 32), (24, 32), (4,128), (8, 128), (16, 128), (24, 128), (32,128), or (64,128). These configurations include support for 32-bit IPv4 addresses or 128-bit IPv6 addresses. The preferred embodiment employs IP addresses as addresses for storage areas; however, it is contemplated that other addresses could also apply, for example, 48-bit or 64-bit MAC addresses could be used to represent a storage area or a 16-bit UDP or TCP port assignment could used to represent a storage area. It is also contemplated that an alternative embodiment could index table 400 based on other bit fields other than the packet header information, in other words lookup table 400 could use any portion of a storage area address.

One ordinarily skilled in the art of software or firmware development will appreciate alternative lookup strategies exist for finding storage area contexts as a function of portions of an address. Each strategy has advantages and disadvantages. For example, for table 400 the entries could be NULL, a pointer to a next table, or could include a pointer to storage area context 150 if there is only a single address associated with that portion. Truncating the search by pointing to the context early in the search eliminates unnecessary searches, but does require a comparison of the address with the context information to ensure the match is correct.

Router Address Lookup Algorithms

An astute reader will recognize the use of multi-bit tries for resolving storage area contexts as being similar to structures used in routers for forwarding tables. In a preferred embodiment, where storage devices or storage areas utilize networking components as part of their addressing schemes it is advantageous to use algorithms that are similar to router address lookup algorithms. Contemplated algorithms include variants using binary trees, recursive flow classification (RFC), using multi-bit tries, PATRICIA (Practical Algorithm to Retrieve Information Coded in Alphanumeric), or other router algorithms. Many of these algorithms are advantageous to use due to their speed in resolving forwarding tables. In some cases, RFC for example, the algorithms will support up to 20 to 40 Gigabytes per second flows through a router, assuming appropriate hardware. Therefore, these algorithms are highly suited for use in storage where context resolution or storage area command derivation is a critical factor for performance.

Recursive Flow Classification

It is contemplated that as network storage grows, storage area addresses will grow more complex to differentiate not only storage areas, but also how storage areas are accessed. Therefore, interpreting the portions of the addresses will grow more critical. In a preferred embodiment, resolving storage area contexts include using variants of RFC.

Figure 5A:
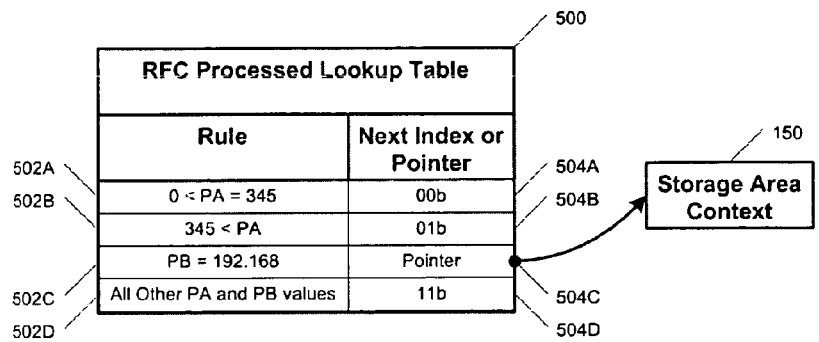
FIG. 5A represents an example of a possible recursive flow classification preprocessed lookup table.

FIG. 5A represents an example of a possible recursive flow classification preprocessed lookup table. RFC employs the concept of preprocessed lookup tables (PLT) that comprise one or more rules for determining a next lookup similar to a multi-bit trie. PLT 500 represents an example table comprising one or more rules, in this particular example there are four rules 502A through 502D. Each of rules 502A through 502D has a value 504A through 504D respectively wherein the value can be used as a portion of a storage area address for subsequent lookups, or could point directly to storage area context 150. RFC employs PLTs to accelerate the search for a value based on a priori known conditions which allows for compression of the address space from the perspective of the storage device. In a preferred embodiment, a storage device constructs PLTs to best fit its address space, responsibilities, or configuration. Therefore, it is contemplated two storage device could construct completely different PLTs due to their different installation parameters or uses.

Figure 5B:
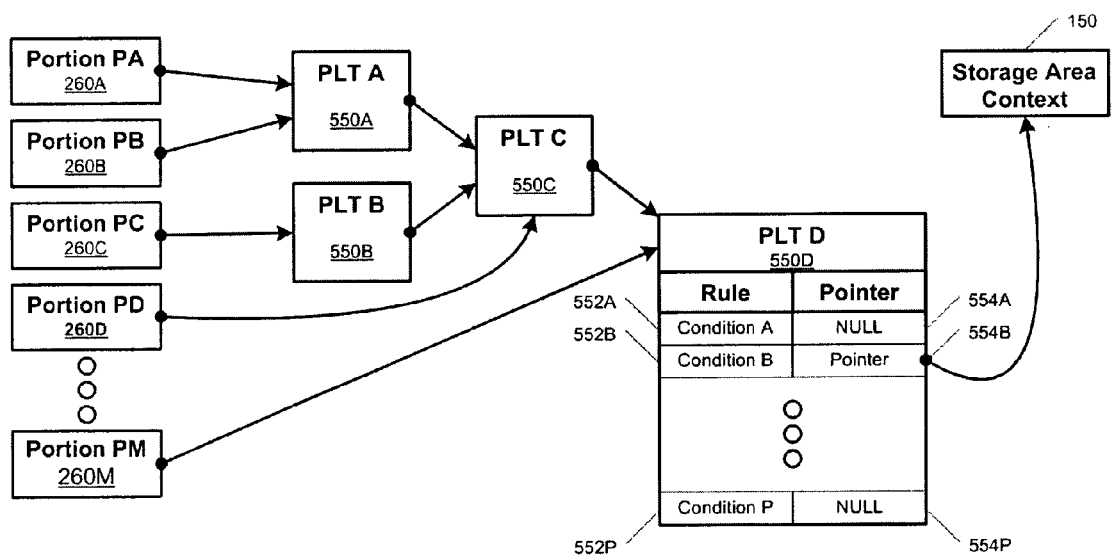
FIG. 5B represents an example of resolving a storage area context through the use of recursive flow classification preprocessed lookup tables.

FIG. 5B represents an example of resolving a storage area context through the use of recursive flow classification preprocessed lookup tables. In the example shown, portions 260A through 260M are used in a series of one or more lookups represented by PLTs 550A through 550D. The values in portion 260A and 260B are run through the rules in PLT 550A which distills the possible options available for a final context. The values of portion 260C are run through the rules of PLT 550B. The results of the PTL 550A, 550B, and the values of portion 260D are distilled further through PLT 550C. Finally, the results of the lookup in PLT 550C are combined with the values of portion 260M in PLT 550D. The storage device consults one or more rules 552A through 552P for a context. In the example, rule 552B corresponds to pointer 554B that reference storage area context 150. In preferred embodiment storage devices employ one or more PLTs each with one or more rules.

In one embodiment RFC can advantageously be used to accelerate processing of packets that employ QoS information as part of a storage area address. A PLT in the RFC algorithm could determine how to access a storage area context. In another embodiment, a PLT could differentiate storage areas by port assignments, reads or writes for example.

Resolving a Storage Area Context

Figure 6:
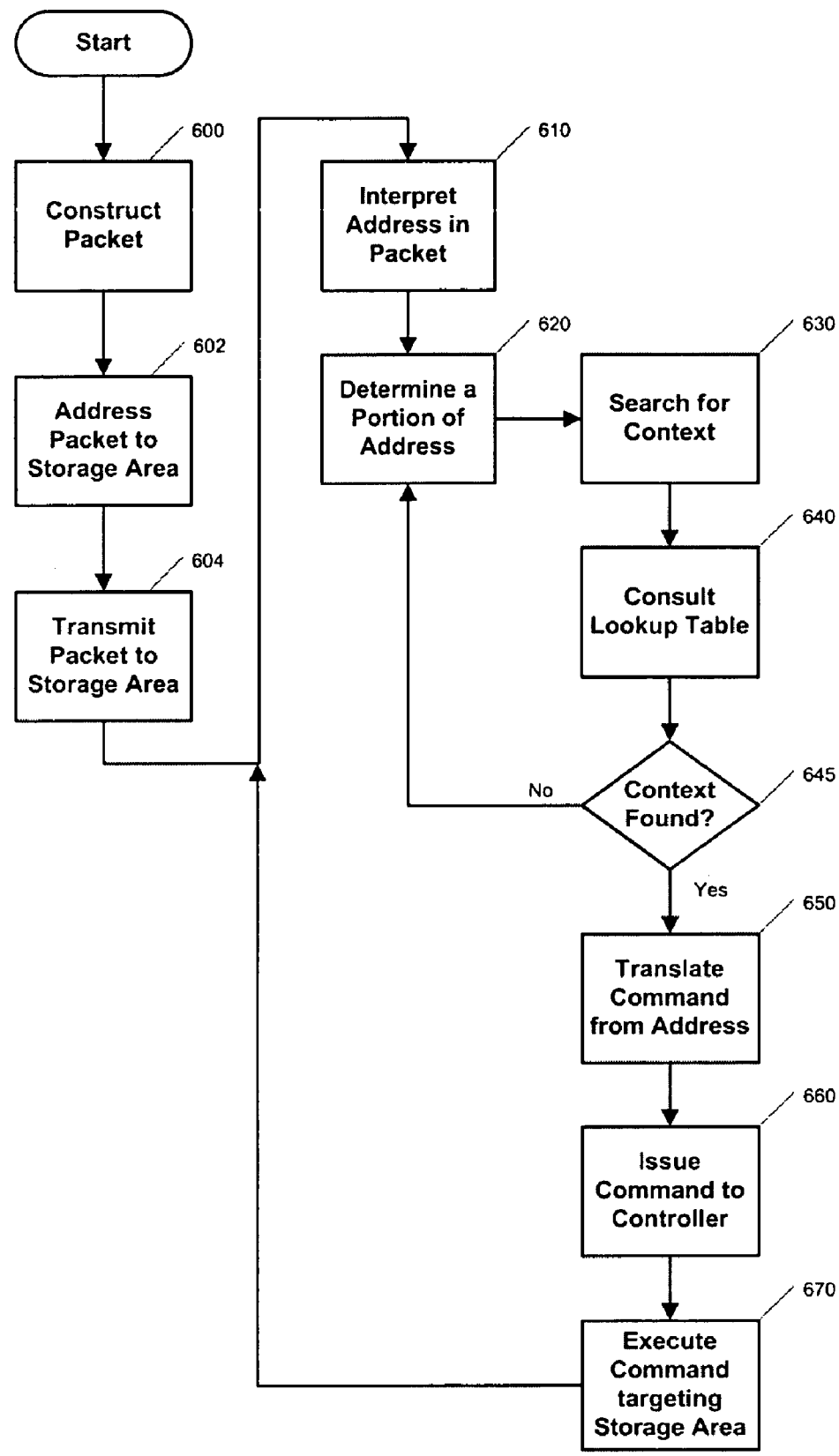
FIG. 6 represents a possible embodiment of steps for deriving a storage area command from an address.

FIG. 6 represents a possible embodiment of steps for deriving a storage area command from an address. In a preferred embodiment a client constructs a packet and addresses the packet to a storage area. A storage device employs some of the steps in FIG. 6 in a broad sense to translate the address into a storage area command. Although FIG. 6 shows an embodiment where a client exchanges packets with a storage area, one skilled in the art of network storage will appreciate that other devices or equipment are also able to participate in the process.

At step 600 a client constructs a network storage packet to exchange information, data, or commands with a target storage area. In some embodiments, the packet comprises standardized protocols including iSCSI or others. In alternative embodiments, the packet comprises non-standardized protocols including those develop to run over stateless protocols.

At step 602 a client includes address information within the packet to address the packet to a storage area. The client uses its knowledge of the address space, network storage infrastructure, or commands associated with the addresses to place address segments within the packet. The segments can advantageously be placed in the control portions of the packet to ensure the communication infrastructure aids resolving the context of the storage area. In addition, the client can place segments of the address in the payload of the packet. For example, if a packet is targeting a logical volume representing a storage area addressable by a multicast address, the packet is addressed to the multicast address in the IP header and includes an LBA in the payload. The packet in this example can be routed to all members of the logical volume.

Once the packet is constructed and comprises an address, the client transmits the packet to the storage area at step 604. Transmission of the packet could include placing the packet on a wired interface or transmitting the packet over a wireless interface. The packet travels from the client over the communication infrastructure, preferably a packet switched network, to a storage device that is responsible for a storage area. Along the way, the packet could be router through the infrastructure based on the storage area address, or more preferably the segments of the address. For example, the packet could be routed by LBA value in addition to an IP address. Furthermore, the address does not necessarily end at the storage device, but rather the storage device further routes the packet internally toward a storage area as part of the process for translating the address into a command.

At step 610 the storage device analyzes information within the packet and interprets the information for the address of a storage area. In one embodiment, a storage device receives packets for storage areas outside of the storage device's control. Therefore, it is contemplated that packets could be silently discarded. Interpretation includes reading one or more fields representing segments of an address in the packet including headers, framing information, or payload information. In a preferred embodiment, IP packet headers are examined for a network address of a storage area, especially if a storage device is responsible for more than one storage area, each with its own network address. It is also contemplated that command fields in the payload, partition tag fields, port assignments, or other fields are interpreted. In an embodiment where storage areas on multiple storage devices are members of a multicast group, storage devices could begin to process commands that are not relevant to the storage device.

At step 620 the storage device converts, if necessary, the segments of the address into one or more portions of the address. The portions could comprise any combination of the following: directly copied bit patterns in the segments, encoded bit patterns, or values set by the storage device.

Once at least one portion of the address has been determined, the storage device begins searching for the context of the target storage area at step 630. Searching at step 640 could include using hash tables, direct lookups, or preferably lookup tables. In a preferred embodiment, the lookup comprises using variants of multi-bit tries. In a more preferred embodiment, conducting the search includes using variants of RFC. The search could be truncated early under cases where the packet is not necessarily targeting a storage area that is under control of a storage device. Therefore, it is contemplated the storage device could silently discard the packet and return to step 610 to interpret the address of the next packet.

At step 645 the storage device determines if the storage area context is not found yet, additional subsequent searches are conducted by resolving a second portion or additional portions of the storage area address at step 620. For example, additional portions could come from the packet or could come from the results of a lookup table as in RFC. In yet another embodiment, if at step 645 the context is not found, the packet is silently discarded. If the context is resolved at step 645, then the storage device translates the address to a command at step 650 to determine its final disposition.

In a preferred embodiment incoming packets are not necessarily correlated; therefore, each individual packet has its storage area context resolved. For network storage packets transported using a stateless protocol (e.g. UDP), the fast resolution of storage area contexts provides for bypassing complex, unnecessary communication stack processing. However, it is also contemplated that the fast resolution method can also be advantageously applied to stateful protocol (e.g TCP) transports as well.

Storage areas could have multiple addresses wherein each address represents a different manner of interacting with the storage area. For example, if a packet includes QoS information similar to the flow label field in IPv6, a module in the storage device could translate the information as a command to place the payload at the head of a queue of commands. One ordinarily skilled in the art of firmware developed will appreciate the numerous possible embodiments of translating addresses into command, all of which fall within the scope of the inventive subject matter. Therefore, at step 650 translates the address, preferably through a context, into a storage area command. It is also contemplated that the address could translate into a command without using a context. For example, if a storage device receives a packet that only has a storage area address comprising an LBA and an IP address, the address itself indicates that the storage area commands is a read. Conversely, if the packet has an LBA, IP address, and data, the storage area command could be a write.

Once the address has been translated to a storage area command, the module within the storage device issues the command to a controller at step 660. Issuing the command could include calling an API, placing a command on a command queue, or adjusting voltage values on the pins of a hardware interface. Because the controller is able to directly interact with a storage area, the controller does not require file system information. In a preferred embodiment, the commands are block oriented and data content independent. At step 670 the controller executes the storage area command targeting the physical storage area addressed in the packet. Once the command is complete or the packet processing is complete, the storage device can return to step 610 to process the next arriving packet.

In a preferred embodiment, a computer readable memory stores instructions to resolve storage area contexts. In a more preferred embodiment, instructions for subsequent searches are stored in another computer readable memory. For example, a proxy/router conducts a first level search and a storage device conducts subsequent searches for the context.

Advantages

Resolving storage area contexts from variable length storage area addresses creates several advantages. Storage area contexts can be found quickly, enabling line-rate processing of network storage packets. This is especially valuable where high performance network storage is demanded, as in video processing for example. Furthermore, through the use of breaking an address into portions, network storage can be disaggregated where network storage infrastructure, proxies for example, provide partial resolution of the address for a storage area. Through the use of variable length addresses and context resolutions, the same software or firmware code can be applied even though different addressing schemes are employed by proxies, storage devices, clients, or other similar network storage equipment. Additionally, as variable length addresses scale, the address space of network storage scales and provides for greater capacity, performance, or reliability. For example, variable length addresses support scenarios where network addresses need to be conserved or where multicast addresses are used in conjunction with unicast addresses.

Thus, specific compositions and methods of resolving storage area contexts from a variable length storage area have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A storage system comprising:
a module configured
to receive, in a manner of a stateless protocol, a packet from a network, the packet having a payload and an Internet protocol (IP) address that corresponds to a physical storage area of a storage device,
to construct a portion based at least in part on the IP address,
to identify, based at least in part on the portion, a storage address context having information related to the physical storage area, and
to derive a storage area command based at least in part on the storage address context; and
a controller coupled to the module and configured
to receive the storage area command from the module, and
to access the physical storage area based at least in part on the storage area command, wherein the module is to derive the storage area command and the controller is to access the physical storage area without use of a file system.

2. The storage system of claim 1, wherein the packet is a first packet and the IP address is a first IP address and the module is to receive a second packet having a second IP address that corresponds to the physical storage area, the first IP address and the second IP address being different addresses.

3. The storage system of claim 2, wherein the storage address context is a first context and the storage area command is a first storage area command and the module is further configured:
to identify a second context based at least in part on the second IP address; and
to derive a second storage area command based at least in part on the second context, the second storage area command being different from the first storage area command.

4. The storage system of claim 1, wherein the packet is a first packet and the IP address is a first address and the module is to receive a second packet having a second address, wherein the first and second addresses comprise different lengths.

5. The storage system of claim 1, wherein the module is to construct the portion by encoding a bit pattern of a segment of the IP address.

6. The storage system of claim 1, wherein the module is to identify the storage address context from a lookup table using the portion as an index.

7. The storage system of claim 6, wherein the lookup table is a recursive flow classification (RFT) preprocessed lookup table (PLT) and the module is to run a value of the portion through a rule in the RFT PLT to provide a result and to identify the storage address context based at least in part on the result.

8. The storage system of claim 1, wherein the IP address comprises an externally controlled address that is at least one of an IPv4 and IPv6 address.

9. The storage system of claim 1, wherein the portion is a first segment of the IP address and the module is further configured to construct a second segment of the IP address and to identify the storage address context by indexing the first segment to a least significant word lookup table to identify a most significant word lookup table and to index the second segment to the most significant word lookup table.

10. The storage system of claim 1, wherein the portion comprises a split segment of the IP address, multiple segments of the IP address, or overlapped segments of the IP address.

11. A method comprising:
receiving a packet from a network, the packet having a payload and an Internet protocol (IP) address that corresponds to a physical storage area of a storage device;
constructing, by a module of the storage device, a portion based at least in part on the IP address;
identifying, by the module based at least in part on the portion, a storage address context having information related to the physical storage area,
deriving a storage area command based at least in part on the storage address context; and
accessing, by a controller of the storage device, the physical storage area based at least in part on the storage area command, wherein said deriving and accessing is done without using a file system.

12. The method of claim 11, wherein said constructing the portion comprises encoding a bit pattern of a segment of the IP address.

13. The method of claim 11, wherein said identifying the context comprises
running a value of the portion through a rule in a recursive flow classification (RFT) preprocessed lookup table (PLT) to provide a result; and
identifying the storage address context based at least in part on the result.

14. The method of claim 11, wherein said identifying the context comprises:
employing a lookup table that is indexed by the portion.

15. The method of claim 14, wherein the portion has a length of X bits, the address has a length of Y bits, X is less than Y, and X and Y form a pair (X, Y) comprising one of the following pairs (4, 32), (8, 32), (16, 32), (24, 32), (4,128), (8, 128), (16, 128), (24, 128), (32,128), and (64,128).

16. The method of claim 11, wherein said identifying the storage address context is based at least in part on multi-bit tries, binary trees, a recursive flow classification, and/or a practice algorithm to retrieve information coded in alphanumeric (PATRICIA).

17. The method of claim 11, wherein the packet is a first packet, the IP address is a first IP address, the storage area command is a first storage area command, and the method further comprises:
receiving a second packet having a second IP address that corresponds to the physical storage area, the second IP address being different from the first IP address;

deriving a second storage area command based at least in part on the second address, the second storage area command being different from the first storage area command.

18. The method of claim 11, wherein said receiving the packet occurs in a manner of a stateless protocol.

19. A computer readable memory having stored thereon, instructions that, if executed on a processing unit, cause a storage device to:
 process a packet received from a network, the packet having a payload and an Internet protocol (IP) address that corresponds to a physical storage area of the storage device;
 construct a portion based at least in part on the IP address,
 identify, based at least in part on the portion, a storage address context having information related to the physical storage area,
 derive a storage area command based at least in part on the storage address context; and
 access the physical storage area based at least in part on the storage area command, wherein the storage device is to derive the storage area command and access the physical storage area without use of a file system.

20. The computer readable memory of claim 19, wherein the packet is a first packet and the IP address is a first IP address and the instructions, if executed on the processing unit, further cause the storage device to
 process a second packet having a second IP address that corresponds to the physical storage area, the first IP address and the second IP address being different addresses.

21. The computer readable memory of claim 20, wherein the storage address context is a first context and the storage area command is a first storage area command and the instructions, if executed on the processing unit, further cause the storage device to:
 identify a second context based at least in part on the second IP address; and
 derive a second storage area command based at least in part on the second context, the second storage area command being different from the first storage area command.

22. The computer readable memory of claim 20, wherein the instructions, if executed on the processing unit, further cause the storage device to:
 construct the portion by encoding a bit pattern of a segment of the IP address.

23. The computer readable memory of claim 20, wherein the instructions, if executed on the processing unit, further cause the storage device to:
 run a value of the portion through a rule in a recursive flow classification (RFT) preprocessed lookup table (PLT) to provide a result; and
 identify the storage address context based at least in part on the result.

* * * * *

UNITED STATES PATENT AND TRADEMARK OFFICE
CERTIFICATE OF CORRECTION

PATENT NO. : 7,649,880 B2 Page 1 of 1
APPLICATION NO. : 11/305679
DATED : January 19, 2010
INVENTOR(S) : Adams et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 799 days.

Signed and Sealed this

Twenty-eighth Day of December, 2010

David J. Kappos
*Director of the United States Patent and Trademark Office*